United States Patent [19]

Smith

[11] Patent Number: 5,791,232

[45] Date of Patent: Aug. 11, 1998

[54] UNIVERSAL ADAPTER PRESSURE CAP

[75] Inventor: Gregory T. Smith, Clovis, Calif.

[73] Assignee: TSE Brakes, Inc., Fresno, Calif.

[21] Appl. No.: 842,134

[22] Filed: Apr. 23, 1997

Related U.S. Application Data

[63] Continuation of Ser. No. 507,696, Jul. 26, 1995, abandoned.
[51] Int. Cl.$^6$ .................................................. F01B 29/00
[52] U.S. Cl. ........................... 92/128; 92/63; 29/890.09
[58] Field of Search .......................... 92/59, 63, 128; 29/888.06, 890.09

[56] References Cited

U.S. PATENT DOCUMENTS

| | | | |
|---|---|---|---|
| 5,285,716 | 2/1994 | Thompson | 92/63 |
| 5,361,877 | 11/1994 | Graham | 188/170 |
| 5,568,761 | 10/1996 | Legendre | 92/128 |

FOREIGN PATENT DOCUMENTS

| | | | |
|---|---|---|---|
| 2013127 | 3/1970 | France | 92/63 |
| 2364367 | 5/1978 | France | 92/63 |
| 1326137 | 8/1973 | United Kingdom | 92/63 |

OTHER PUBLICATIONS

Undated three–page document by OBI entitled "Introducing Black Max II".
Four Undated photographs of a Midland brake adapter plate.

*Primary Examiner*—Thomas E. Denion
*Attorney, Agent, or Firm*—Fulbright & Jaworski L.L.P.

[57] ABSTRACT

A double diaphragm spring brake actuator comprising both a spring brake actuator and a service brake actuator separated by a universal adapter pressure cap, which allows the service brake actuator to be used as a stand-alone unit, or coupled to a spring brake actuator.

12 Claims, 3 Drawing Sheets

5,791,232

1

UNIVERSAL ADAPTER PRESSURE CAP

This is a continuation of Ser. No. 08/507,696 filed Jul. 26, 1995, now abandoned.

TECHNICAL FIELD OF THE INVENTION

The present invention relates to braking systems operated by air or other fluids, and more particularly, to actuators driven by fluid pressure, designed either to be stand-alone units or part of "double diaphragm" spring brake actuators.

BACKGROUND OF THE INVENTION

A fluid powered brake actuator in common use today comprises, essentially, a pressure chamber, one wall of which is formed by a diaphragm, and an actuator rod. When the operator wishes to stop the vehicle, fluid pressure is increased within the pressure chamber causing the diaphragm to urge the actuator rod outward, which in turn engages the brake itself. Often a relatively weak return spring mechanism is provided which returns the actuator rod and diaphragm to their "off" position when the fluid pressure is reduced in the pressure chamber. Such an assembly is referred to as a service brake actuator.

Frequently, service brake actuators are designed and built in conjunction with a spring brake actuator in which a main power spring activates the brakes if the fluid pressure falls below a predetermined minimum, providing a safety mechanism in the event of a malfunction of the braking system. These combined systems are referred to as "double diaphragm spring brake actuators". Manufacturers often offer both double diaphragm actuators and stand-alone service brake actuators.

In double diaphragm actuators, the wall of the spring brake actuator distant from the main power spring also serves as one pressure wall of the service brake actuator. Another pressure wall consists of the diaphragm within the service brake actuator. Thus, the service brake actuator portion of a double diaphragm actuator will not function independently of the whole device. Manufacturers producing both stand-alone service brake actuators and double diaphragm actuators design, tool and manufacture each product item or unit line separately. Accordingly, they must design, tool and manufacture two separate lines of spare parts, which must be kept on hand by rebuilders who service these different types of brake systems.

SUMMARY OF THE INVENTION

Accordingly, the present invention provides a universal adapter, consisting of a spring section adaptor base and a service section adaptor base. The service section adapter base may be coupled to a service brake actuator portion of a double diaphragm actuator, allowing the service brake actuator to function as a stand-alone unit, and which can be produced with the same tooling as the dual diaphragm actuators.

BRIEF DESCRIPTION OF THE DRAWINGS

The invention can be best understood with reference to the attached drawings, in which.

DETAILED DESCRIPTION OF THE INVENTION

Figure 1:
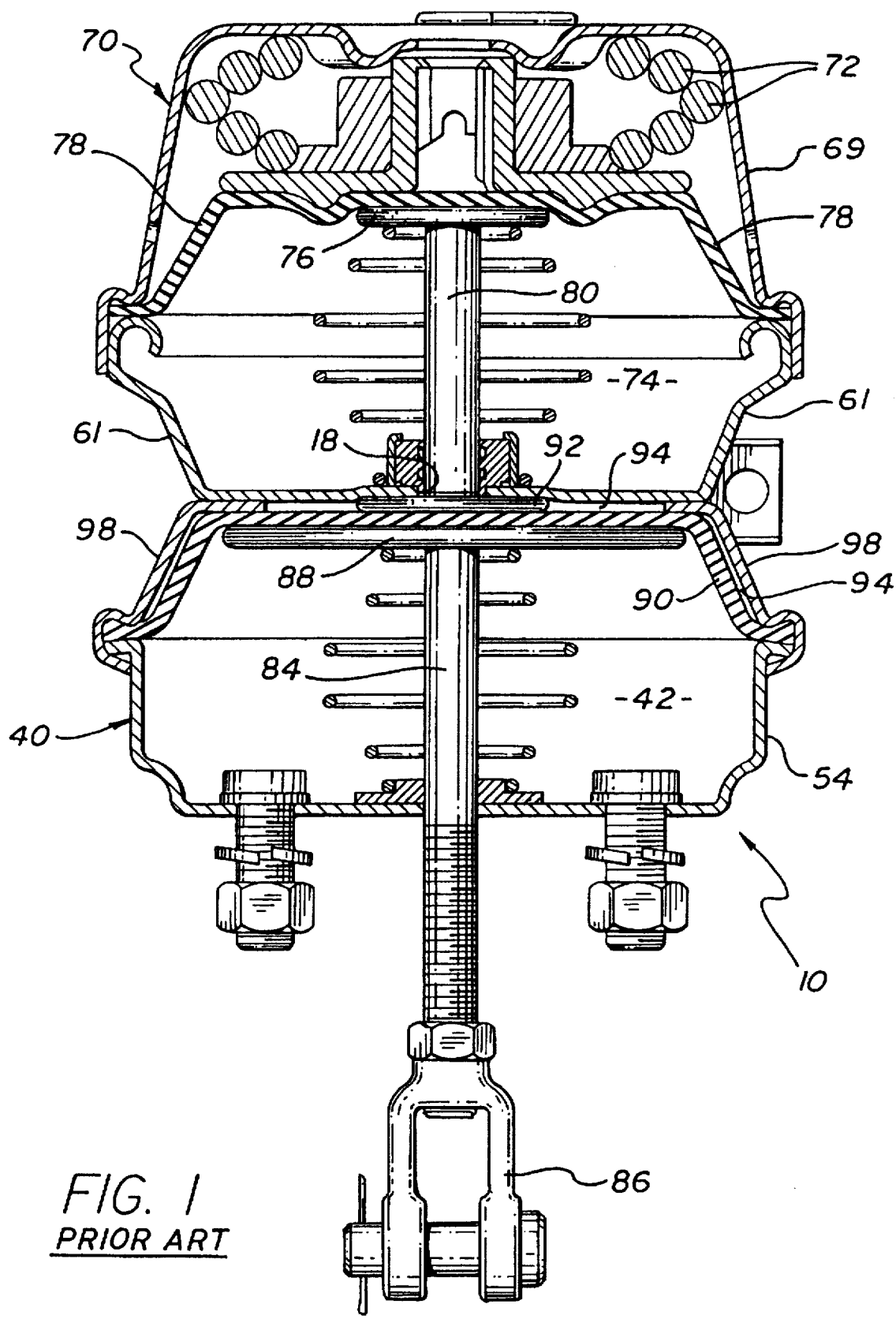
FIG. 1 is a cross-sectional view of a conventional double diaphragm spring brake actuator.

FIG. 1 shows a conventional double diaphragm spring brake actuator 10, which includes a spring brake actuator 70 coupled to a service brake actuator 40. The service brake actuator 40 comprises a housing 54, a non-pressurized chamber 42, a pressure chamber 94 which is separated from the non-pressurized chamber 42 by a diaphragm 90, and an service section adaptor base 98. The non-pressurized chamber 42 also includes a service push rod 84, which has a guide end 86 and a plate end 88. The plate end 88 is adjacent to the diaphragm 90 and the guide end 86 is coupled to the brake mechanism (not shown). In typical operation, depression of a foot brake pedal (not shown) will result in a fluid being pumped into the service brake pressure chamber 94 causing that chamber to expand. Such expansion forces the service brake diaphragm 90 against the plate end 88 of the service push rod 84 urging the push rod 84 away from the service brake actuator 40. Due to such movement, the guide end 86 activates the brakes (not shown).

The spring brake actuator 70 is coupled to the service brake actuator 40 by means of a coupled-together service section adaptor base 98 and spring section adaptor base 61. The service section adaptor base 98 forms part of an outer wall of the service brake pressure chamber 94 as well as part of an outer wall of the spring brake actuator 70. Part of the outer wall of the spring brake actuator 70 is also formed by a spring brake housing 69 and the spring section adaptor base 61. The spring brake actuator 70 also includes a power spring 72 which in normal use is compressed against a spring brake diaphragm 78 which, in turn, is adjacent to, and normally compressed against, a spring pushrod plate 76. The spring brake diaphragm 78 forms a wall of a spring brake pressure chamber 74. The spring brake pressure chamber 74 also includes a wall opposite to the spring brake diaphragm 78, formed by the coupled together spring section adaptor base 61 and the service section adaptor base 98. A spring brake push rod 80 passes through the spring section adaptor base 61 through an aperture 18. The spring brake push rod 80 has two ends, one end which is comprises the spring pushrod plate 76, which in turn rests flush against the spring brake diaphragm 78, and an adaptor end 92, which is within the service brake pressure chamber 94, and adjacent to the service brake diaphragm 90.

The spring brake actuator 70 is coupled to the service brake actuator 40 by attaching the spring section adaptor base 61 to the service section adaptor base 98, then interposing that assembly between service brake housing 54 and the spring brake housing 69, and securing said structure together, creating fluid tight seals for the pressure chamber 94 and the spring brake pressure chamber 74.

The spring brake actuator 70 applies the brakes in the event brake fluid pressure falls below a predetermined level in the following manner. Should fluid escape from the system, the pressure exerted by the fluid in the spring brake pressure chamber 74 against the spring brake diaphragm 78 is reduced, allowing the power spring 72 to decompress, urging the spring pushrod plate 76 and the spring brake push rod 80 outward, which in turn urges the diaphragm 90 and thereby the service push rod 84 outward, activating the brakes.

As can be seen, any attempt to use the service brake actuator 40 uncoupled from the spring brake actuator 70 would be futile, the spring section adaptor base 61 forms part of a wall of the service brake pressure chamber 94. Thus pressure in the service brake pressure chamber 94 can only be maintained with the spring brake actuator 70 coupled. Indeed, any service brake made from the same tooling as the conventional double diaphragm spring brake actuator 10 would similarly be nonfunctional.

Figure 2:
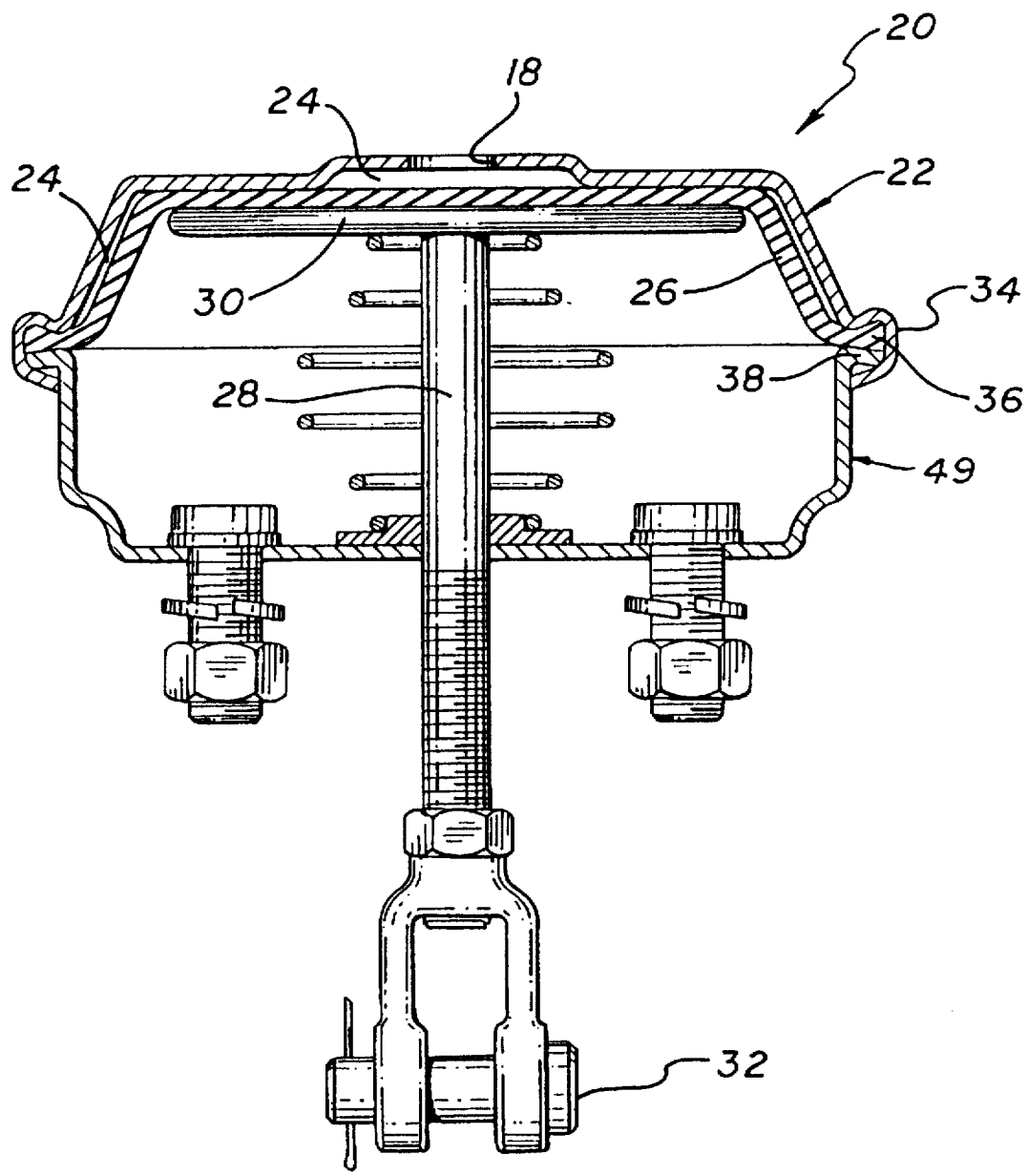
FIG. 2 is a cross-sectional view of a service brake actuator constructed in accordance with the present invention.

FIG. 2 shows a service brake actuator 20 built according to the present invention. The service brake actuator 20, includes a universal service section adapter cap 22 (see also FIG. 3) which forms a fluid tight outer wall of a pressure chamber 24. Another wall of the pressure chamber 24 is formed by a diaphragm 26. The diaphragm 26 is adjacent to a push rod 28. The push rod 28 has two ends, one of which forms a push rod plate 30, which is adjacent to the diaphragm 26, and a guide end 32 which is distant from the diaphragm 26. The universal service section adapter cap 22 has a circumferential outer end 34, which can be mounted to the service brake actuator 20 in any number of ways. For instance, FIG. 2 shows how the circumferential outer end 34 can be crimped about a circumferential end of the diaphragm 36 and a circumferential end 38 of a service brake housing 49, forming a fluid-tight seal between the universal service section adapter cap 22 and the diaphragm 26. Such an attachment and seal can be achieved in other ways, such as by clamping the circumferential outer end 34 of the universal service section adapter cap 22, the circumferential end of the diaphragm 36, and the circumferential end 38 of the service brake housing 49, together (not shown).

Viewing FIG. 2 along side FIG. 1, it can be seen that the service brake housing 49, diaphragm 26, push rod 28, and pressure chamber 24, of the present invention, are identical to the housing 54, diaphragm 90, push rod 84, and pressure chamber 94 of the service brake portion 40 of the conventional double diaphragm brake actuator 10.

The universal service section adapter cap 22 of FIG. 2 is quite different from the service section adaptor base 98 of FIG. 1, in that the universal service section adapter cap 22 forms a complete wall of the pressure chamber 24 and does not require any part of the spring brake actuator 70 (i.e., the spring section adaptor base 61) to complete said wall.

Thus, by the substitution of the universal service section adapter cap 22 of the present invention for the service section adaptor base 98 of the conventional double diaphragm spring brake actuator 10, a service brake actuator 20 that was either part of a conventional double diaphragm spring brake actuator 10 or was built to the same specification and/or built with the same tooling, can now function as a stand-alone unit.

Figure 3:
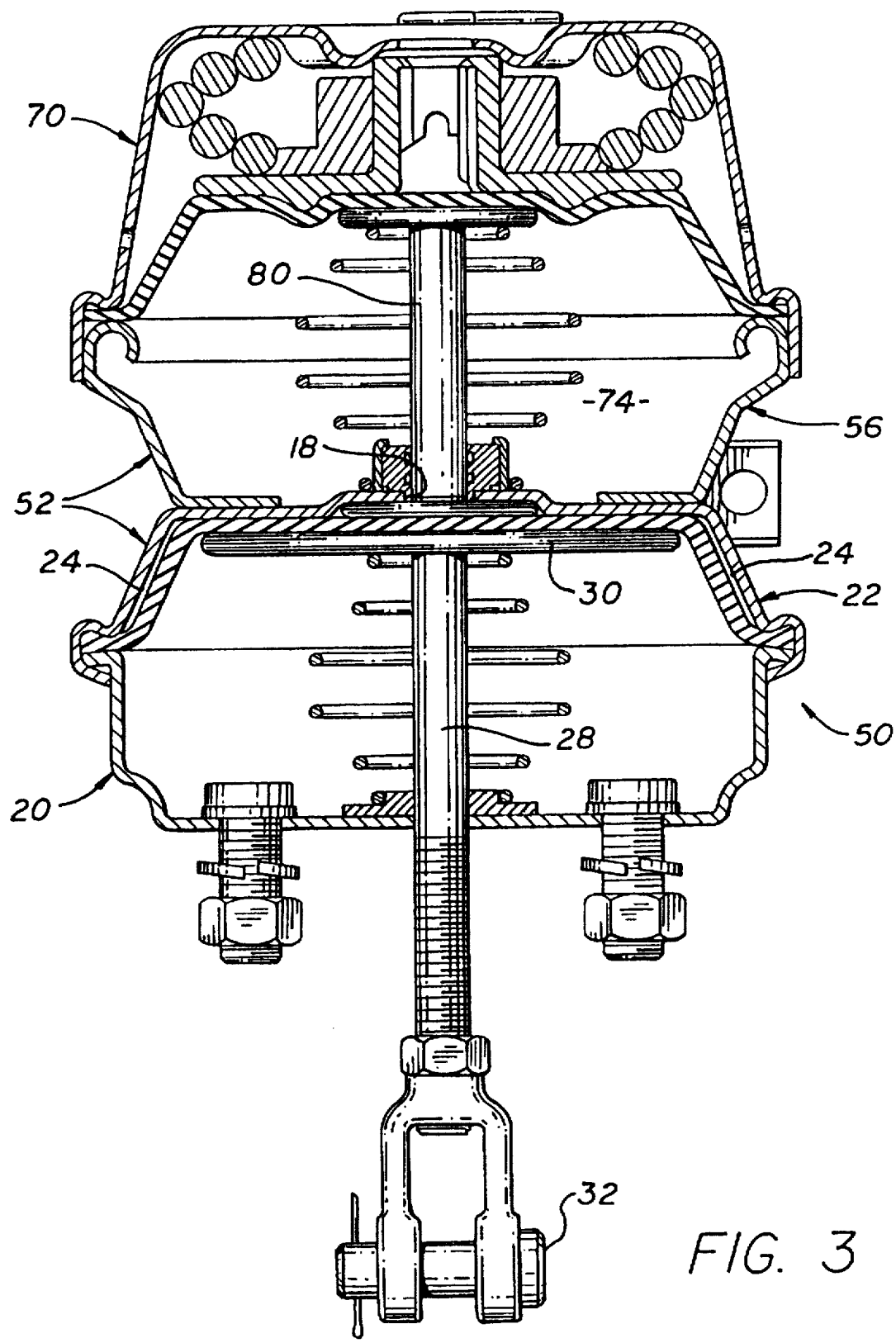
FIG. 3 is a cross-sectional view of a double diaphragm spring brake actuator constructed in accordance with the present invention.

FIG. 3 shows a double diaphragm spring brake actuator 50 constructed in accordance with the present invention. The double diaphragm spring brake actuator 50 is identical to the conventional double diaphragm spring brake actuator 10 of FIG. 1 in all significant respects, except that the spring section adaptor base 61 and the service section adaptor base 98 have been replaced with a universal adapter 52. The universal adapter 52 consists of the universal service section adapter cap 22 of FIG. 2, and a universal spring section adapter base 56, coupled together.

The universal spring section adapter base 56 forms part of a wall of the spring brake pressure chamber 74. The remainder of that wall is formed by the universal service section adapter cap 22.

If the service brake actuator 20 is to be used as part of a double diaphragm spring brake actuator 50, the universal service section adapter cap 22 must have an aperture 18 which allows the spring brake push rod 80 to pass therethrough in a sealing relationship. The aperture 18 can be formed in a number of ways. For instance, the universal service section adapter cap 22 can be designed with aperture 18 preformed, or aperture 18 can be drilled after manufacture of the universal service section adapter cap 22. Once the aperture 18 and appropriate sealing means (not shown) are in place, the universal service section adapter cap 22 is ready for use in a double diaphragm spring brake actuator 50.

Whether the universal service section adapter cap 22 was manufactured with the aperture 18 already in place, or the aperture 18 was installed after production, the aperture 18 can be provided with a fluid tight sealing plug (not shown) made of readily available materials, such as metal, rubber or plastics. Once so sealed, the universal service section adapter cap 22 is suitable for mounting in a stand alone service brake actuator 20, not coupled to a spring brake actuator 70.

The present invention thereby provides a method of fabricating stand-alone service brake actuators 20 out of parts built to the same specifications or with the same tooling as double diaphragm spring brake actuators 50.

Referring to FIGS. 2 & 3, utilizing the present invention, a user will apply the brakes, which results in a fluid being pumped into the pressure chamber 24. The pressure is resisted by the universal service section adapter cap 22, which is not deformable, and the diaphragm 26, which is deformable and thus expands in response to the pressure. Such expansion forces the diaphragm 26 against the push rod plate 30, urging the push rod 28 away from the service brake actuator 20. Such movement causes the guide end 32 to activate the brakes (not shown).

Manufacturers wishing to use the service brake actuator 20 as part of a double diaphragm spring brake actuator 50 will create an aperture 18 in the universal service section adapter cap 22, insert the spring brake push rod 80 therethrough, and mount the universal service section adapter cap 22 to the universal spring section adapter base 56 of the spring brake actuator 70. Manufacturers wishing to use the service brake actuator 20 of the double diaphragm spring brake actuator 50 as a stand alone unit need only plug the aperture 18. Thus, the same parts inventory produced by the same tooling can be used for both stand alone service brake actuators 20 and double diaphragm spring brake actuators 50.

Other embodiments of the present invention can be constructed by those skilled in the art without departing from the spirit and scope of the invention.

We claim:

1. Method for making brake actuators, including single diaphragm service brake actuators and double diaphragm combination service and spring brake actuators, comprising:

providing at least two service brake housings having a base portion, an open diaphragm retaining portion interfacing with a pressure chamber;

providing at least two service brake adaptor plates, adapted for coupling to the diaphragm retaining portion of the service brake housing;

providing at least one spring brake housing having a spring retaining portion, a diaphragm retaining portion interfacing with a pressure chamber;

providing at least one spring brake adaptor plate, being adapted for coupling to the diaphragm retaining portion of the spring brake housing and defining a central opening;

constructing a double diaphragm combination service and spring brake actuator by first creating a combination adaptor plate by coupling the spring brake adapter plate to one of the service brake adapter plates, then interposing said combination adapter plate between the open diaphragm retaining portions of the service brake housing and the spring brake housing, and securing said structure together; and constructing a single diaphragm service brake actuator by securing one of the service brake adapter plates to the open diaphragm retaining portion of the service brake housing.

2. Method of claim 1 wherein a common die is used to form both the spring brake and service brake adapter plates.

3. Method of claim 1 wherein said adapter plate, is coupled to the open diaphragm retaining portion of the service brake housing by crimping a circumferential edge of said adapter plate around both a circumferential edge of the service brake base portion and a circumferential edge of the diaphragm, in a sealing relationship.

4. Method of claim 1 wherein the service brake adapter plate is secured to the service brake housing by crimping a periphery of said adapter plate.

5. Method of claim 1 wherein the service brake adapter plate is secured to the service brake housing by welding.

6. Method of claim 1 wherein the service brake adapter plates and the spring brake adapter plate are of differing sizes to permit spring brake housings to be coupled to service brake housings of different sizes.

7. Method of claim 1 wherein each of said service brake adaptor plates has a central opening.

8. Method of claim 7 further comprising:

constructing a single diaphragm service brake actuator by obstructing the central opening in one of the service brake adapter plates having a central opening and securing same to the open diaphragm retaining portion of the service brake housing.

9. Method of claim 1 wherein said step of providing at least two service brake adaptor plates, adapted for coupling to the diaphragm retaining portion of the service brake housing, further comprises the step of:

providing some, but not all, service brake adaptor plates with a central opening; and wherein said step of constructing a single diaphragm service brake actuator by securing one of the service brake actuator plates to the open diaphragm retaining portion of the service brake housing, further comprises the step of:

securing one of the service brake actuator plates not having a central opening to the open diaphragm retaining portion of the service brake housing.

10. Method of claim 8 further comprising:

constructing a double diaphragm combination service and spring brake actuator by first creating a combination adaptor plate by boring a central opening in one of the brake adaptor plates not having a central opening and coupling same to the spring brake adapter plate, then interposing said combination adapter plate between the open diaphragm retaining portions of the service brake housing and the spring brake housing, and securing said structuring together.

11. Method of claim 9 further comprising:

constructing a single diaphragm service brake actuator by obstructing the central opening in one of the service brake adapter plates having a central opening and securing same to the open diaphragm retaining portion of the service brake housing.

12. Method of claim 1 wherein the service brake adapter plate is secured to the service brake housing by clamping the adapter plate, service brake housing and diaphragm retaining portion together.

* * * * *